United States Patent
Onufryk et al.

(10) Patent No.: US 8,601,346 B1
(45) Date of Patent: Dec. 3, 2013

(54) SYSTEM AND METHOD FOR GENERATING PARITY DATA IN A NONVOLATILE MEMORY CONTROLLER BY USING A DISTRIBUTED PROCESSING TECHNIQUE

(75) Inventors: Peter Z. Onufryk, Flanders, NJ (US); Inna Levit, Sunnyvale, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 309 days.

(21) Appl. No.: 13/052,835

(22) Filed: Mar. 21, 2011

Related U.S. Application Data

(60) Provisional application No. 61/374,242, filed on Aug. 16, 2010.

(51) Int. Cl.
*G11C 29/00* (2006.01)

(52) U.S. Cl.
USPC .......................................... 714/764; 711/103

(58) Field of Classification Search
USPC .......................................... 711/103; 714/764
See application file for complete search history.

(56) References Cited

U.S. PATENT DOCUMENTS

| | | | |
|---|---|---|---|
| 5,875,343 A | 2/1999 | Binford et al. | |
| 7,620,784 B2 | 11/2009 | Panabaker | |
| 7,708,195 B2 | 5/2010 | Yoshida et al. | |
| 8,244,946 B2 | 8/2012 | Gupta et al. | |
| 2008/0256280 A1 | 10/2008 | Ma | |
| 2008/0320214 A1* | 12/2008 | Ma et al. | 711/103 |
| 2009/0077302 A1* | 3/2009 | Fukuda | 711/103 |
| 2010/0185808 A1* | 7/2010 | Yu et al. | 711/103 |
| 2010/0262979 A1 | 10/2010 | Borchers et al. | |
| 2011/0161678 A1* | 6/2011 | Niwa | 713/193 |

OTHER PUBLICATIONS

NVM Express, revision 1.0; Intel Corporation; pp. 103-106 and 110-114; Jul. 12, 2011.
NVM Express, Revision 1.0; Intel Corporation; Mar. 1, 2011.

* cited by examiner

*Primary Examiner* — M. Mujtaba K Chaudry
(74) *Attorney, Agent, or Firm* — Kenneth Glass; Stanley J. Pawlik; Glass & Associates

(57) ABSTRACT

A nonvolatile memory controller performs a data stripe operation on data blocks by processing a collection of commands. The nonvolatile memory controller includes command processing units, each of which processes a command of the data stripe operation to store a data block into a nonvolatile memory device. A parity calculator in the nonvolatile memory controller receives the data blocks of the data stripe operation by receiving a sequence of data blocks. The parity calculator generates a parity block in a page frame as the parity calculator receives the sequence of the data blocks. A command processing unit in the nonvolatile memory controller determines when the parity calculator has completed generating the parity block and writes the parity block to a nonvolatile memory device.

18 Claims, 12 Drawing Sheets

SYSTEM AND METHOD FOR GENERATING PARITY DATA IN A NONVOLATILE MEMORY CONTROLLER BY USING A DISTRIBUTED PROCESSING TECHNIQUE

CROSS-REFERENCE TO RELATED APPLICATION

This application claims benefit of U.S. provisional patent application Ser. No. 61/374,242 filed Aug. 16, 2010 and entitled "Non Volatile Memory Host Controller Interface Device," which is incorporated herein by reference in its entirety.

BACKGROUND

Fault-tolerant computing systems often employ data storage techniques for recovery of data lost as a result of a disk drive failure. These data storage techniques often involve a redundant array of independent disks (RAID). In some of these data storage techniques, a disk drive controller performs a data stripe operation by dividing data into data blocks and generating parity data based on the data blocks. In this way, the disk drive controller generates redundancy data based on the data blocks. The disk drive controller distributes the data blocks and the parity data among an array of disk drives. In event of a hardware failure of a disk drive in the array, the disk drive controller reconstructs the data in the failed disk drive based on the data stored in the other disk drives of the array, and stores the reconstructed data into a replacement disk drive.

Because generation of parity data in a RAID operation is often a computationally intensive task, some types of disk drive controllers include a dedicated processor for generating parity data. In these types of disk drive controllers, the dedicated processor stores data blocks into individual data buffers of the disk drive controller, executes computing instructions to generate parity data, and stores the parity data into yet another data buffer. Although use of a dedicated processor for generating parity data generally improves throughput of a disk drive controller, generation of parity data is still a performance bottleneck in many disk drive controllers. Moreover, the data buffers consume a considerable amount of area and power in integrated circuit implementations of the disk drive controller.

SUMMARY

In various embodiments, a nonvolatile memory controller performs a data stripe operation by processing a collection of commands. The collection of commands includes data update commands and a parity write command. The nonvolatile memory controller includes a number of command processing units, each of which receives a command in the collection of commands. Each of the command processing units receiving a data update command requests a data block from a controller memory, receives the data block from the controller memory through a data path in response to the request, and writes the data block to a nonvolatile memory device.

The parity calculator receives the data blocks as a sequence of data blocks through the same data path from which the command processing units receive the data blocks. The parity calculator generates a parity block by storing a first data block of the sequence of data blocks into a page frame and updating the data block stored in the page frame with each remaining data block in the sequence of data blocks. In this way, the parity calculator generates the parity block on the fly as the command processing units are receiving the data blocks for the data stripe operation.

Because the nonvolatile memory controller performs a data stripe operation by using a plurality of command processing units, the nonvolatile memory controller performs a data stripe operation more quickly than other methods using only a single dedicated processor to perform a data stripe operation. Moreover, because the parity calculator generates the parity block in the page frame as the parity calculator is receiving the data blocks for the data stripe operation, the parity calculator need not store all the data blocks of the data stripe at the same time when generating a parity block. As a result, the nonvolatile memory controller consumes less power and area than other nonvolatile memory controllers in which data blocks of a data stripe operation are stored in individual data buffers when computing a parity block.

A nonvolatile memory controller, in accordance with one embodiment, performs a data stripe operation on block blocks. The nonvolatile memory controller includes command processing units and a parity calculator. The parity calculator is coupled to the command processing units. Each of the command processing units is configured to receive a command of a plurality of commands for performing the data stripe operation. The commands include data update commands and a parity write command. Each command processing unit receiving a data update command is configured to request a data block of the data blocks based on the data update command, receive the data block in response to the request, and write the data block to a nonvolatile memory device. The parity calculator is configured to receive the data blocks and generate a parity block based on the data blocks. The command processing unit receiving the parity write command is configured to write the parity block to a nonvolatile memory based on the parity write command.

A nonvolatile memory controller, in accordance with one embodiment, includes a command distribution unit, command processing units, and a parity calculator. The command processing units are coupled to the command distribution unit and the parity calculator. The command distribution unit is configured to receive commands for performing a data stripe operation on data blocks. The commands include data update commands and a parity write command. The command distribution unit is further configured to distribute the data update commands among at least some of the command processing units. Each of the command processing units receiving a data update command is configured to request a data block based on the data update command, receive the data block in response to the request, and write the data block to a nonvolatile memory device. The parity calculator includes a context memory including a page frame. Moreover, the parity calculator is configured to receive the data blocks as a sequence of data blocks. Further, the parity calculator is configured to generate a parity block by storing a first data block of the sequence of data blocks into the page frame and updating the data block stored in the page frame with each data block following the first data block in the sequence of data blocks. The command distribution unit is further configured to determine generation of the parity block is complete and distribute the parity write command to a command processing unit in response to determining the parity block is complete. The command processing unit receiving the parity write command is configured to write the parity block into the nonvolatile memory device.

A method for generating parity data, in accordance with one embodiment, includes distributing commands for performing a data stripe operation among a number of command processing units in the nonvolatile memory controller. The commands include a number of data update commands and a parity write command. The method further includes generating data requests by the command processing units based on data update commands, and receiving data blocks at the command processing units and at a parity calculator of the nonvolatile memory controller in response to the data requests. Additionally, the method includes writing the data blocks to nonvolatile memory devices by the command processing units. The method also includes generating a parity block in a page frame of a context memory based on the data blocks. Further, the method includes determining generation of the parity block is complete and writing the parity block to a nonvolatile memory device based on the parity write command after generation of the parity block is complete. Because the method performs a data stripe operation by using a plurality of command processing units, the method performs a data stripe operation more quickly than other methods using only a single dedicated processor to generate parity data.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a nonvolatile memory controller includes command processing units and a parity calculator for performing a data stripe operation. Each of the command processing units independently requests a data block from a controller memory, receives the data block from the controller memory through a data path in response to the request, and writes the data block to a nonvolatile memory device. The parity calculator receives the data blocks as a sequence of data blocks through the same data path from which the command processing units receive the data blocks. The parity calculator generates a parity block by storing a first data block of the sequence of data blocks into the page frame and updating the data block stored in the page frame with each remaining data block in the sequence of data blocks in response to receiving the data block. In this way, the parity calculator generates the parity block on the fly as the command processing units and the parity calculator are receiving the data blocks for the data stripe operation.

Figure 1:
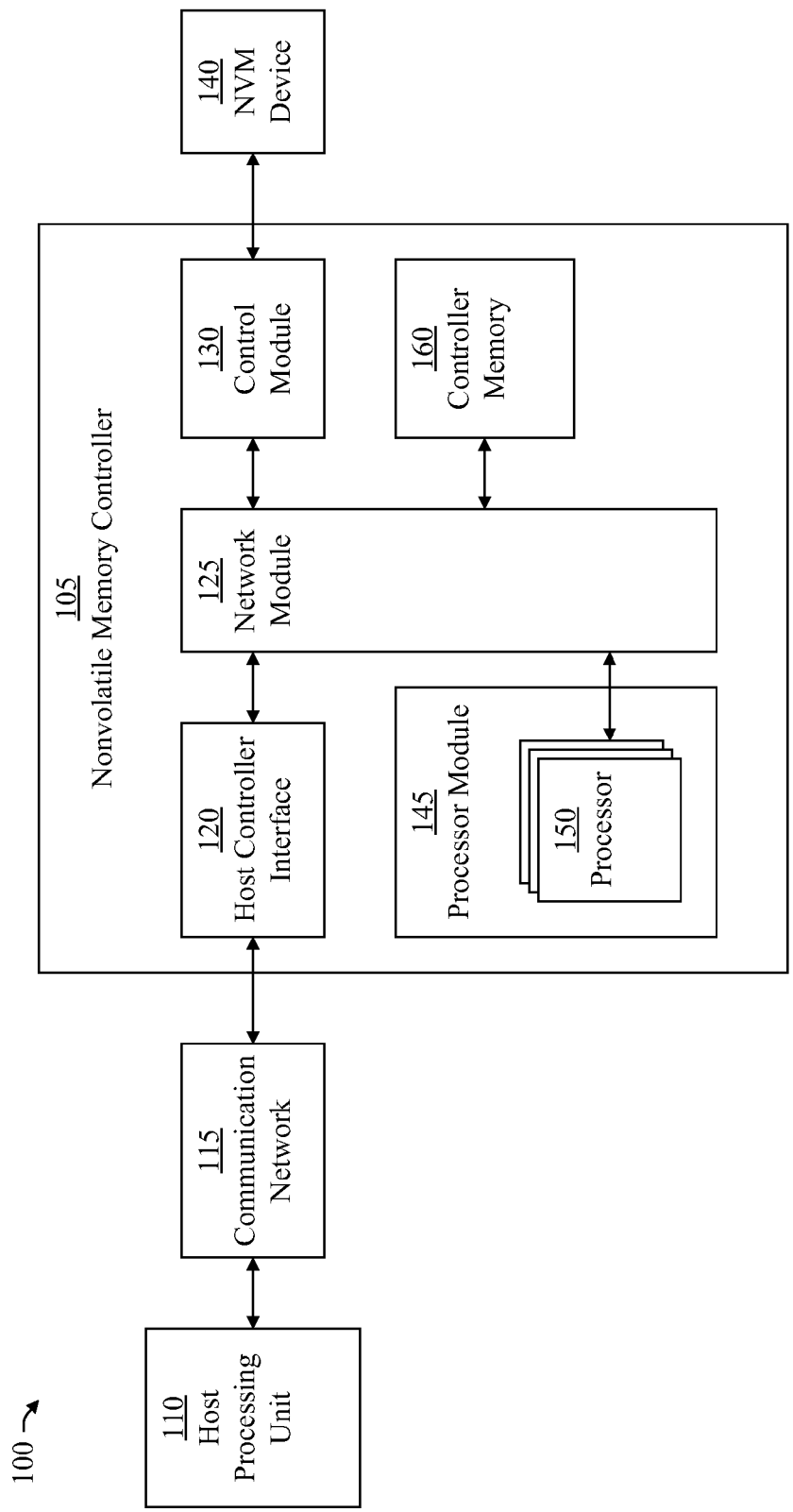
FIG. 1 is a block diagram of a computing system, in accordance with an embodiment of the present invention.

FIG. 1 illustrates a computing system 100, in accordance with an embodiment of the present invention. The computing system 100 includes a host processing unit 110, a communication network 115, a nonvolatile memory controller 105, and a nonvolatile memory device 140. The communication network 115 is coupled (e.g., connected) to the host processing unit 110 and the nonvolatile memory controller 105. Additionally, the nonvolatile memory controller 105 is coupled (e.g., connected) to the nonvolatile memory device 140. In various embodiments, the nonvolatile memory device 140 is a flash storage device and the nonvolatile memory controller 105 is a flash controller.

The communication network 115 facilitates communication between the host processing unit 110 and the nonvolatile memory controller 105. For example, the communication network 115 may be a packet communication network, such as a Peripheral Component Interconnect Express (PCIe) network. The nonvolatile memory controller 105 manages data stored in the nonvolatile memory device 140 and communicates with the host processing unit 110 through the communication network 115 for transferring data between the host processing unit 110 and the nonvolatile memory device 140. In various embodiments, the nonvolatile memory controller 105 processes nonvolatile memory commands generated by the host processing unit 110 for controlling operation of the nonvolatile memory controller 105. In some embodiments, the host processing unit 110 generates Non-Volatile Memory Express (NVMe) commands and the nonvolatile memory controller 105 processes the (NVMe) commands to manage operation of the nonvolatile memory controller 105.

In various embodiments, the nonvolatile memory controller 105 includes a host controller interface 120, a network module 125, a control module 130, a processor module 145, and a controller memory 160. The network module 125 is coupled (e.g., connected) to the host controller interface 120, the control module 130, the processor module 145, and the controller memory 160. Additionally, the host controller interface 120 is coupled (e.g., connected) to the communication network 115, and the control module 130 is coupled (e.g., connected) to the nonvolatile memory device 140. Furthermore, the processor module 145 includes processors 150 coupled (e.g., connected) to the network module 125. In these embodiments, each of the host controller interface 120, the control module 130, the processors 150, and the controller memory 160 is a functional unit of the nonvolatile memory controller 105.

In various embodiments, each of the host controller interface 120, the control module 130, the processor module 145, and the controller memory 160 is source node or a destination node of the nonvolatile memory controller 105. In this way, each functional unit of the nonvolatile memory controller 105 may be a source node or a destination node. In some embodiments, one or more of the host controller interface 120, the control module 130, the processor module 145, and the controller memory 160 is both a source node and a destination node of the nonvolatile memory controller 105. In this way, a functional unit of the nonvolatile memory controller 105 may be both a source node and a destination node.

The host controller interface 120 facilitates communication between the communication network 115 and the functional units of the nonvolatile memory controller 105 through the network module 125. The control module 130 manages data in the nonvolatile memory device 140. For example, the control module 130 may read data from the nonvolatile memory device 140 and write data into the nonvolatile memory device 140.

The controller memory 160 stores data being transferred from the host processing unit 110 to the nonvolatile memory device 140. Additionally, the controller memory 160 stores data being transferred from the nonvolatile memory device 140 to the host processing unit 110. In this way, the controller memory 160 is an intermediate storage location for temporarily storing data being transferred between the host processing unit 110 and the nonvolatile memory device 140. In various embodiments, the controller memory 160 includes a random access memory (RAM), such as a static random access memory (SRAM) or a dynamic random access memory (DRAM).

In various embodiments, the host controller interface 120 retrieves a request packet including a nonvolatile memory command from the host processing unit 110 through the communication network 115, generates a request message packet including the nonvolatile memory command based on the request packet, and provides the request message packet to the network module 125. In turn, the network module 125 routes the request message packet to the processor module 145. The processor module 145 processes the nonvolatile memory command in the request message packet, generates a completion message packet including a completion status (e.g., a completion entry) based on the request message packet, and provides the completion message packet to the network module 125. The network module 125 routes the completion message packet to the host controller interface 120.

The host controller interface 120 generates a request packet including the completion status based on the completion message packet and transmits the request packet to the host processing unit 110 through the communication network 115. In turn, the host processing unit 110 stores the completion status of the request message packet received from the host controller interface 120 and processes the completion status to determine the status of processing the nonvolatile memory command (i.e., a processing status).

In various embodiments, a processor module 145 processes the nonvolatile memory command in a request message packet by generating additional request message packets, each of which includes a command. The processor 150 provides the request message packets to the network module 125. In turn, the network module 125 routes each of the request message packets received from the processor module 145 to a functional unit of the nonvolatile memory controller 105 identified in the request message packet. In this way, the processor 150 functions as a source node and the functional unit receiving the request message packet functions as a destination node.

The functional unit receiving a request message packet from the processor 150 through the network module 125 processes the command in the request message packet, generates a completion message packet including a completion status based on the request packet, and provides the completion message packet to the network module 125. The completion status of the completion message packet indicates a status of the command processed by the functional unit (i.e., a processing status). The network module 125 routes the completion message packet to the processor 150.

In various embodiments, the processor module 145 processes the nonvolatile memory command in the request message packet received from the host controller interface 120 by generating a request message packet including a data transfer command for transferring data between the host processing unit 110 and the controller memory 160, and generating another request message packet including a data transfer command for transferring data between the controller memory 160 and the nonvolatile memory device 140. In this way, the processor module 145 generates request message packets for transferring data in a piecemeal manner between the host processing unit 110 and the nonvolatile memory device 140 based on the request message packet including the nonvolatile memory command.

In some cases, each functional unit receiving a request message packet from the processor module 145 generates one or more request data packets based on the request message packet. Each of the request data packets is a request for transferring data between functional units of the nonvolatile memory controller 105 through the network module 125 or transferring data between the host processing unit 110 and the host controller interface 120. For example, the control module 130 may generate request data packets and provide the request data packets to the network module 125 for routing to the controller memory 160. In this example, the controller memory 160 generates completion packets including data stored in the controller memory 160 and provides the completion packets to the network module 125 for routing to the control module 130.

In various embodiments, the nonvolatile memory controller 105 is implemented in an integrated circuit of an integrated circuit device which may include an integrated circuit package containing the integrated circuit. In some embodiments, the nonvolatile memory controller 105 is implemented in more than one integrated circuit of an integrated circuit device which may include a multichip package containing the integrated circuits.

Figure 2:
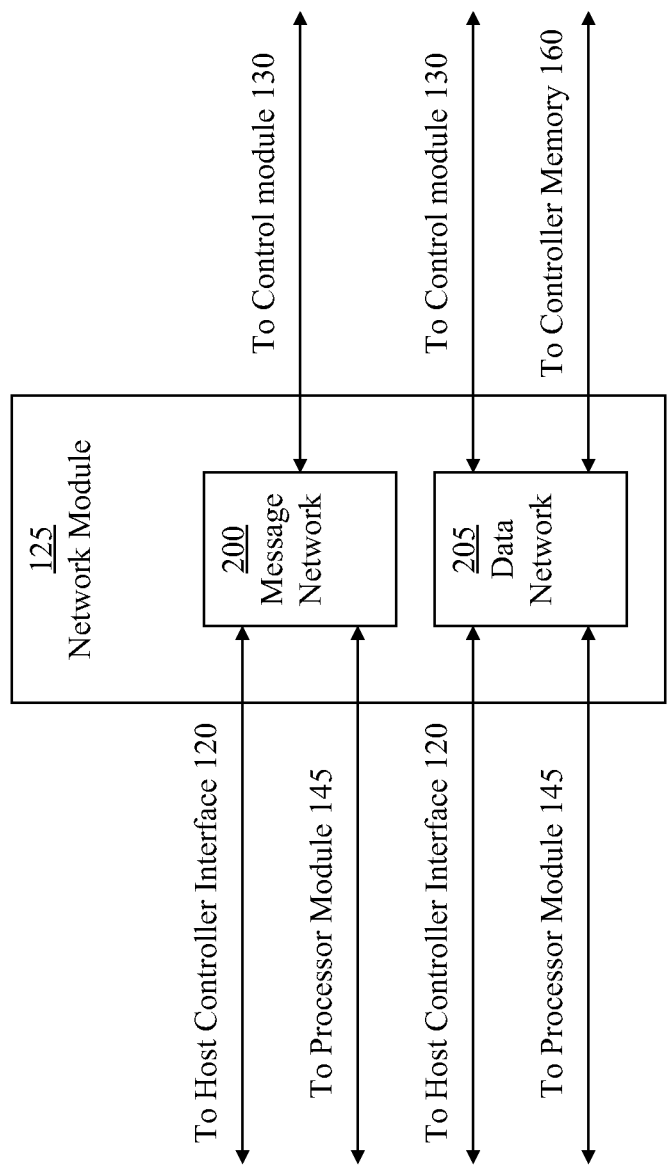
FIG. 2 is a block diagram of a network module, in accordance with an embodiment of the present invention.

FIG. 2 illustrates the network module 125, in accordance with an embodiment of the present invention. The network module 125 includes a message network 200 and a data network 205. Each of the message network 200 and the data network 205 is coupled (e.g., connected) to the host controller interface 120, the control module 130, the processor module 145. Additionally, the data network 205 is coupled (e.g., connected) to the controller memory 160.

The message network 200 routes message packets, such as request message packets and completion message packets, between functional units of the nonvolatile memory controller 105. In various embodiments, the message network 200 routes message packets among functional units of the nonvolatile memory controller 105 by using an inter-processor communication (IPC) protocol.

The data network 205 routes data packets, such as data request packets and data completion packets, between functional units of the nonvolatile memory controller 105. In various embodiments, the data network 205 routes data packets among functional units of the nonvolatile memory controller 105 by using an inter-processor communication (IPC) protocol.

Figure 3:
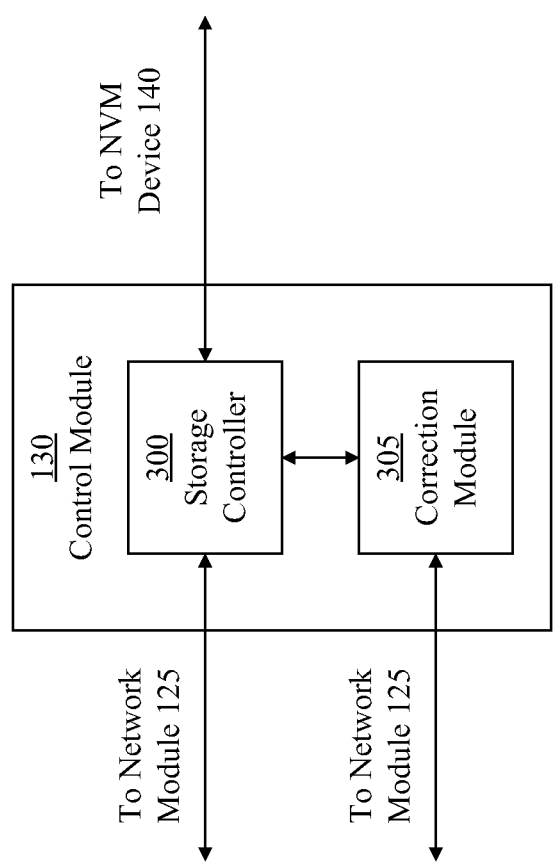
FIG. 3 is a block diagram of a control module, in accordance with an embodiment of the present invention.

FIG. 3 illustrates the control module 130, in accordance with an embodiment of the present invention. The control module 130 includes a storage controller 300 and a correction module 305. The storage controller 300 is coupled (e.g., connected) to the network module 125, the nonvolatile memory device 140, and the correction module 305. The correction module 305 is also coupled (e.g., connected) to the network module 125.

The storage controller 300 manages data in the nonvolatile memory device 140. For example, the storage controller 300 may read data from the nonvolatile memory device 140 and write data into the nonvolatile memory device 140. The correction module 305 generates an error correction code (ECC) for data to be stored into the nonvolatile memory device 140 and provides the error correction code to the storage controller 300. In turn, the storage controller 300 writes the data and the error correction code associated with the data into the nonvolatile memory device 140. Additionally, the storage controller 300 reads data and an error correction code associated with the data from the nonvolatile memory device 140 and provides the data and the error correction code to the correction module 305. In turn, the correction module 305 detects data bit errors in the data, if any, and corrects the data bit errors based on the error correction code associated with the data.

Figure 4:
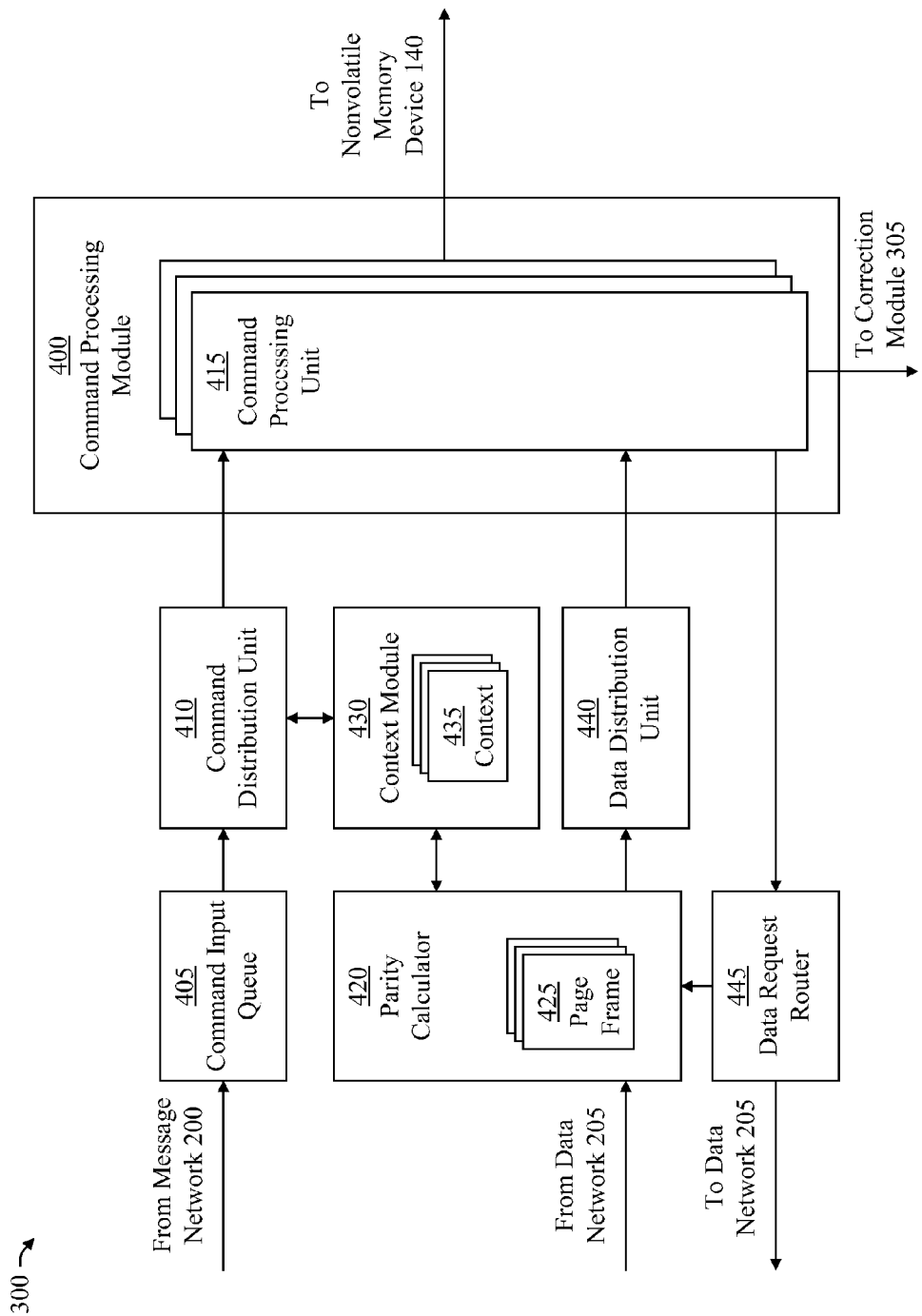
FIG. 4 is a block diagram of a storage controller, in accordance with an embodiment of the present invention.

FIG. 4 illustrates the storage controller 300, in accordance with an embodiment of the present invention. The storage controller 300 includes a command processing module 400, a command input queue 405, a command distribution unit 410, a parity calculator 420, a context module 430, a data distribution unit 440, and a data request router 445. The command input queue 405 is coupled (e.g., connected) to the message network 200 and the command distribution unit 410. Additionally, the command distribution unit 410 is coupled (e.g., connected) to the command processing unit 415 and the context module 430. The parity calculator 420 is coupled to the data network 205, the context module 430, the data distribution unit 440, and the data request router 445. The data request router 445 is coupled (e.g., connected) to the data network 205 and the command processing module 400. Additionally, the command processing module 400 is coupled (e.g., connected) to the data distribution unit 440, the nonvolatile memory device 140, and the correction module 305.

As illustrated in FIG. 4, the command processing module 400 includes command processing units 415. The command processing units 415 process commands for managing data in the nonvolatile memory device 140, as is described more fully herein. Although three command processing units 415 are illustrated in FIG. 4, the command processing module 400 may have more or fewer than three command processing units 415 in other embodiments.

The parity calculator 420 includes page frames 425. Moreover, the parity calculator 420 generates parity blocks in the page frames 425, as is described more fully herein. The context module 430 includes contexts 435 corresponding to the page frames 425 in the parity calculator 420. Moreover, each of the page frames 425 is associated with the corresponding context 435 in the context module 430. The contexts 435 includes data for controlling processing of the commands of a data stripe operation by the storage controller 300, as is described more fully herein. Although three page frames 425 and three contexts 435 are illustrated in FIG. 4, the parity calculator 420 may have more or fewer than three page frames 425 and the context module 430 may have more or fewer than three contexts 435 in other embodiments.

In various embodiments, a processor 150 in the processor module 145 generates commands for performing a data stripe operation (i.e., data stripe commands). The commands include data update commands for writing data blocks into the nonvolatile memory device 140 and a parity write command for writing a parity block into the nonvolatile memory device 140. The processor 150 generates request message packets, each of which includes a command of the data stripe operation. The command includes a command identifier for identifying the type of the command as either a data update command or a parity write command. Additionally, the command includes a flow identifier, a request tag, and a destination address of a storage location in the nonvolatile memory device 140. Each of the commands of the data stripe operation has a same flow identifier. In this way, the commands of the data stripe operation form a collection of commands associated with each other through the flow identifier. The processor 150 provides the request message packets including the commands for the data stripe operation to the message network 200. In turn, the message network 200 route the request message packets to the storage controller 300.

The storage controller 300 receives the request message packets of the data stripe operation from the message network 200 and stores the request message packets in the command input queue 405. In various embodiments, the command input queue 405 is a first-in-first-out (FIFO) queue and the storage controller 300 stores the request message packets of the data stripe operation at a tail of the command input queue 405. Because the command input queue 405 receives and stores other packets (e.g., request message packets including data read commands or data erase commands) from the message network 200, the request message packets of the data stripe operation may be interleaved with other packets in the command input queue 405.

The command distribution unit 410 reads a request message packet at a head of the command input queue 405 and determines whether the request message packet includes a command of a data stripe operation (i.e., a data stripe command). If the request message packet includes a data update command of a data stripe operation, the command distribution unit 410 determines whether the data update operation is associated with a context 435 in the context module 430 based on a flow identifier in the request message packet. If the data update operation is not associated with a context 435, the command distribution unit 410 associates the data stripe operation with a context 435 based on the flow identifier in the request message packet. Moreover, the command distribution unit 410 associates commands having a same flow identifier with the same context 435, as is also described more fully herein. In this way, the command distribution unit 410 associates commands of a data stripe operation with a context 435 based on the flow identifier.

Additionally, the command distribution unit 410 selects a command processing unit 415 in the command processing module 400 for the request message packet including the data update command and provides (e.g., routes) the request message packet to the selected command processing unit 415. In this way, the command distribution unit 410 distributes the data update command in the request message to the selected processor. In various embodiments, the command distribution unit 410 distributes data update commands of a data stripe operation to a number of command processing units 415 such that each of those command processing units 415 receives one of the data update commands of the data stripe operation. In this way, the command distribution unit 410 stripes the commands of the data stripe operation among command processing units 415 in the command processing module 400.

If the request message packet at the head of the command input queue 405 includes a parity write command of a data stripe operation, the command distribution unit 410 determines whether the data update commands of the data stripe operation are complete. If the data update commands of the data stripe operation are complete, the command distribution unit 410 distributes the write parity command of the data stripe operation to a command processing unit 415 in the command processing module 400. Otherwise, the command distribution unit 410 monitors the data update commands of the data stripe operation and distributes the write parity command to a command processing unit 415 in the command processing module 400 when the data update commands are complete.

Each command processing unit 415 receiving a request message packet including a data update command from the command distribution unit 410 generates a data request packet including the data update command based on the request message packet. The data request message includes the flow identifier contained in the request message packet as well as the request tag contained in the request message packet. Additionally, the data request message includes a destination address of a storage location in the controller memory 160. The command processing unit 415 provides the data request packet to the data request router 445. In some embodiments, the command processing unit 415 arbitrates for access to the data request router 445 by providing an arbitration request to the data request router 445. In these embodiments, the command processing unit 415 provides the data request packet to the data request router 445 is response to receiving a grant from the data request router 445.

The data request router 445 routes (e.g., forwards) the data request packet including the data update command to the data network 205. In turn, the data network 205 routes the data request packet to the controller memory 160, for example based on an identifier of the controller memory 160 contained in the data request packet. In various embodiments, the data request router 445 identifies a type of the command in the data request message packet received from the data request router 445. If the command in the data request packet is a parity write command, data request router 445 routes the data request packet to the parity calculator 420. Otherwise, the data request router 445 routes the data request packet to the data network 205.

The controller memory 160 reads a data block at a storage location identified by the destination address in the data request packet and generates a completion packet including the data block. For example, the controller memory 160 may read the data block from a dynamic random access memory (DRAM) in the controller memory 160. The completion block also includes the flow identifier contained in the data request packet and the request tag contained in the data request packet. In this way the completion packet is associated with the data request packet. The controller memory 160 provides the completion packet to the data network 205. In turn, the data network 205 routes the completion packet to the storage controller 300, for example based on an identifier of the storage controller 300 in the completion packet.

The parity calculator 420 receives the completion packet routed to the storage controller 300 and forwards the completion packet to the data distribution unit 440. In turn, the data distribution unit 440 distributes the completion packet to the command processing unit 415 that generated the data request message associated with the completion packet (i.e., the data request message including the same request tag contained in the completion packet). In this way the parity calculator 420 and the command processing unit 415 receive the completion packet including the data block from the data network 205 at substantially the same time (i.e., substantially simultaneously). The command processing unit 415 receiving the completion packet writes the data block of the completion packet to the nonvolatile memory device 140 at the address of the nonvolatile memory device 140 contained in the request message packet associated with the completion packet (i.e., the request message packet containing the same request tag contained in the completion packet).

Additionally, the parity calculator 420 processes the completion packet as part of a process of generating a parity block for the data stripe operation. In response to receiving the completion packet, the parity calculator 420 identifies the context 435 of the data stripe operation associated with the data block. Additionally, the parity calculator 420 identifies the page frame 425 associated with the context 435. If the data block contained in the completion packet is the first data block of the data stripe operation received by the parity calculator 420, the parity calculator 420 stores the data block into the page frame 425. In this way, the parity calculator 420 initializes a parity block in the page frame 425.

Otherwise, if the data block contained in the completion packet is not the first data block of the data stripe operation received by the parity calculator 420, the parity calculator 420 generates an updated data packet by performing an operation on the data block stored in the page frame 425 and the data block contained in the completion packet. Further, the parity calculator 420 replaces the data block stored in the page frame 425 associated with the updated data block. In this way, the parity calculator 420 updates the parity block stored in the page frame 425.

The updated data block generated by the parity calculator 420 based on last data block of the data stripe operation is a parity block of the data stripe operation. Moreover, the parity calculator 420 completes generation of the parity block for the data stripe operation by storing the updated data block of the data stripe operation into the page frame 425. In this way, the parity calculator 420 generates the parity block of the data operation on the fly as completion packets including data blocks of the data operation are received by the storage controller 300 and forwarded to the command processing units 415.

In some embodiments, the operation performed by the parity calculator 420 is a logical exclusive-or (XOR) operation. In these embodiments, the parity block generated by parity calculator 420 is an exclusive-or of the data blocks in the data stripe operation. In some embodiments, the parity calculator 420 generates more than one parity block for a data stripe operation. For example, the parity calculator 420 may generate a p-parity block and a q-parity block according to a level 6 redundant array of independent disk (RAID Level 6) algorithm. In this example, the operation performed by the parity calculator 420 includes a logical exclusive- or operation and a logical shift operation. In various embodiments, the operation performed by the parity calculator includes other logical or mathematical functions in addition to a logical exclusive-or operation, for example to implement a RAID Level 5 or RAID Level 6 algorithm.

In some embodiments, a size of a data block received by the parity calculator 420 is less than a size of the parity block generated by the parity calculator 420. For example, the size of the data block may be half the size of the parity block. In these embodiments, the completion packet indicates a position of the data block for performing the operation on the data block and the parity block. For example, the completion packet may indicate that the operation is to be performed on the data block and a first half of the parity block. As another example, the completion packet may indicate that the operation is to be performed on the data block and a second half of the parity block. In this way, the parity calculator 420 updates the parity block in a piecemeal manner based on data blocks having a smaller size than the parity block.

A command processing unit 415 receiving a request message packet including a parity write command from the command distribution unit 410 generates a data request packet including the parity write command based on the request message packet. The data request packet includes the flow identifier of the request message packet and the request tag contained in the request message packet. The command processing unit 415 provides the data request packet to the data request router 445. In some embodiments, the command processing unit 415 arbitrates for access to the data request router 445 by providing an arbitration request to the data request router 445. In these embodiments, the command processing unit 415 provides the data request packet to the data request router 445 is response to receiving a grant from the data request router 445.

The parity calculator 420 identifies the context 435 of the data stripe operation associated with the write parity command based on the flow identifier in the data request packet. Further, the parity calculator 420 reads the parity block from the page frame 425 associated with the context 435 and generates a completion packet including the parity block. The completion packet also includes the flow identifier contained in the data request packet and the request tag contained in the data request packet. The parity calculator 420 provides the completion packet to the data distribution unit 440.

The data distribution unit 440 distributes the completion packet including the parity block to the command processing unit 415 in the command processing module 400 that generated the data request packet including the parity write command. For example, the data distribution unit 440 may identify the command processing unit 415 based on the request tag in the completion packet. The command processing unit 415 receiving the completion packet writes the parity block of the completion packet to the nonvolatile memory device 140 at the address of the storage location in the nonvolatile memory device 140 contained in the request message packet associated with the completion packet (i.e., the request message packet containing the same request tag contained in the completion packet).

In various embodiments, the data network 205 is a data path for transmitting data packets (e.g., completion packets) from the controller memory 160 to the parity calculator 420 and the command processing units 415 of the storage controller 300. In this way, both the parity calculator 420 and the command processing units 415 receive packets from the controller memory 160 through the data path.

Figure 5:
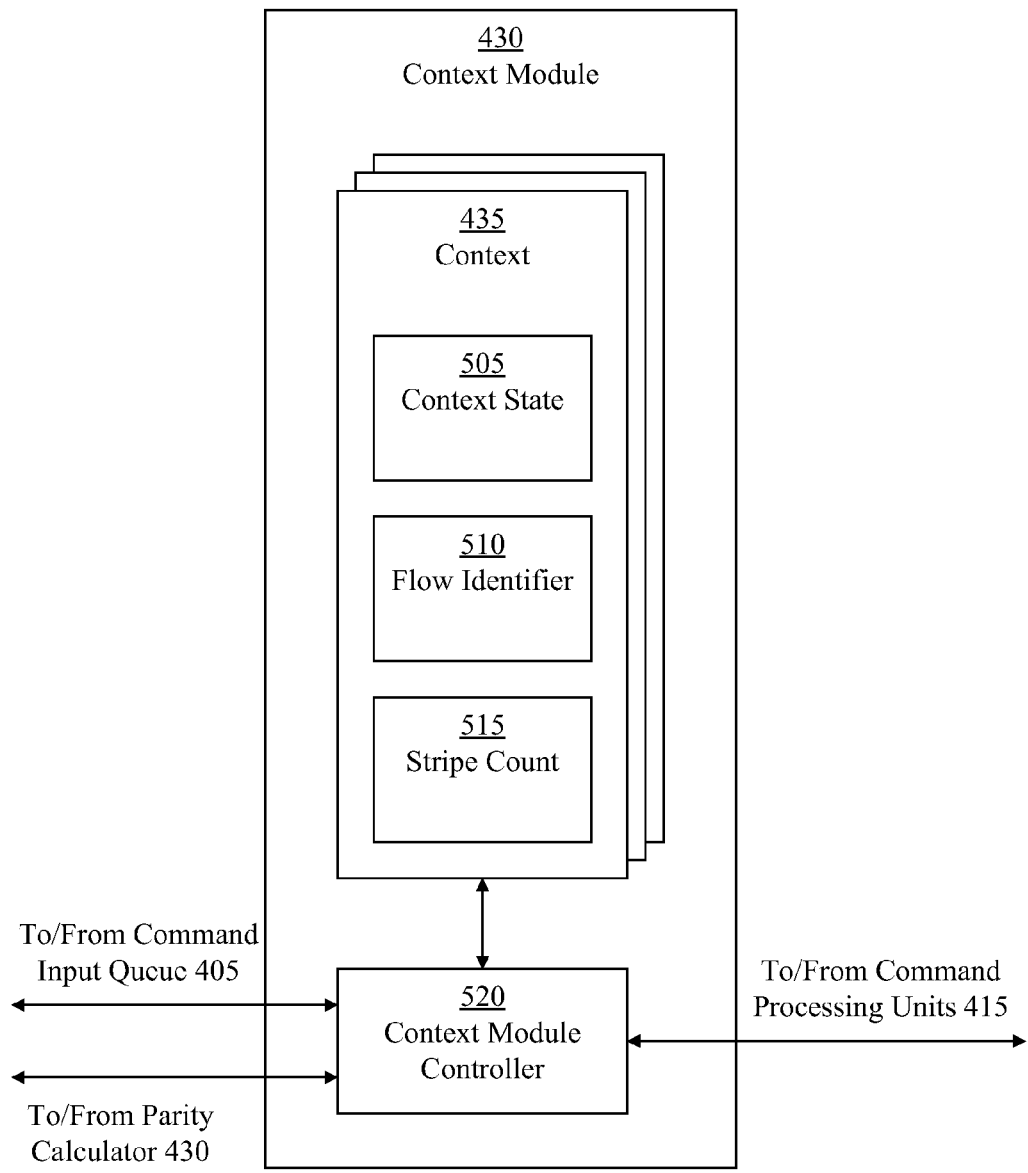
FIG. 5 is a block diagram of a context module, in accordance with an embodiment of the present invention.

FIG. 5 illustrates the context module 430, in accordance with an embodiment of the present invention. In addition to the contexts 435, the context module 430 includes a context module controller 520 coupled to the contexts 435 for controlling access to the context 435. Each context 435 includes a context state 505, a flow identifier 510, and a stripe count 515. In various embodiments, the context 435 includes storage locations for storing the context state 505, the flow identifier 510, and the stripe count 515 of the context 435. For example, the storage locations of the context 435 may be registers or a portion of a random access memory (RAM).

The context state 505 of the context 435 is a value indicating a state of context 435. In one embodiment, the context state 505 is an idle state, an allocated state, an initialized state, or a computed state, as is described more fully herein. The flow identifier 510 is a value for associating commands of a data stripe operation with the context 435 and for identifying the context 435 associated with a data stripe operation. The stripe count 515 is value for determining when a data stripe operation is complete, as is also described more fully herein.

In operation, the command distribution unit 410 receives a request message packet from the command input queue 405 and determines whether the request message packet includes a data update command. If the request message packet includes a data update command, the command distribution unit 410 determines whether the data stripe operation associated with the data update command has been allocated to a page frame 425 in the parity calculator 420. In this process, the command distribution unit 410 identifies each context 435 in the allocated state or the initialized state. For each identified context 435, the command distribution unit 410 determines whether a flow identifier in the request message packet is the same as the flow identifier 510 of the context 435. If the flow identifier in the request message packet is the same as the flow identifier 510 of an identified context 435, the command distribution unit 410 determines the data stripe operation is associated with the context 435. In this way, command distribution unit 410 also determines the page frame 425 associated with the context 435 is allocated to the data stripe operation.

If the command distribution unit 410 determines that a page frame 425 in the parity calculator 420 has not been allocated to the data stripe operation associated with the update command in the request message packet, the command distribution unit 410 identifies a context 435 in the idle state. Further, the command distribution unit 410 allocates the page frame 425 associated with the context 435 to the data stripe operation by modifying (e.g., updating) the context state 505 of the context 435 to the allocated state and modifying the flow identifier 510 of the context 435 to the flow identifier contained the request message packet.

In addition to allocating the page frame 425 in the parity calculator 420 to the data stripe operation, the command distribution unit 410 initializes the stripe count 515 to an initial stripe count based on the number of data blocks in the data stripe operation. In various embodiments, the stripe count 515 is a predetermined value. In one embodiment, the initial stripe count is equal to the number of data blocks in the data stripe operation. In this embodiment, the parity calculator 420 decrements the stripe count 515 when initializing a parity block in the page frame 425 associated with the context 435 and when updating the parity block in the page frame 425, as is described more fully herein. In another embodiment, the initial stripe count 515 is one less than the number of data blocks in the data stripe operation. In this embodiment, the parity calculator 420 decrements the stripe count 515 when updating a parity block in the page frame 425 associated with the context 435 but does not decrement the stripe count 515 when initializing the parity block in the page frame 425, as is also described more fully herein.

In various embodiments, the parity calculator 420 determines an operation to perform on a data block of a data stripe operation received by the parity calculator 420 based on the context state 505 of the context 435 associated with the data stripe operation. If the context state 505 is the allocated state, the parity calculator 420 initializes a parity block in the page frame 425 associated with the context 435 by storing the data block into the page frame 425, as is described more fully herein. Additionally, the parity calculator 420 changes the context state 505 from the allocated state to the initialized state. In some embodiments, the parity calculator 420 also updates (e.g., decrements) the stripe count 515 of the context 435 to indicate the parity calculator 420 processed the data block received by the parity calculator 420.

Otherwise, if the parity calculator 420 receives a data block of a data stripe operation and the context state 505 of the context 435 associated with the data stripe operation is the initialized state, the parity calculator 420 updates the data block (e.g., parity block) stored in the page frame 425 associated with the context 435 by performing an operation on the data block received by the parity calculator 420 and the data block stored in the page frame 425, as is described more fully herein. Additionally, the parity calculator 420 updates (e.g., decrements) the stripe count 515 in the context module 430 associated with the data operation to indicate the parity calculator 420 processed the data block received by the parity calculator 420.

Further, the parity calculator 420 determines whether the data block received by the parity calculator 420 is the last data block of the data stripe operation based on the stripe count 515 of the context 435. In various embodiments, the parity calculator 420 determines the data block received by the parity calculator 420 is the last data block of the data stripe operation by determining the stripe count 515 has reached a threshold value (e.g., zero). If the parity calculator 420 determines the data block received by the parity calculator 420 is the last data block of the data stripe operation, the parity calculator 420 modifies (e.g., updates) the context state 505 of the context 435 associated with the data stripe operation to the completed state. In this way, the parity calculator 420 indicates generation of the parity block is complete.

The command distribution unit 410 determines generation of the parity block for the data stripe operation is complete by determining the context state 505 of the context 435 associated with the data stripe operation is in the completed state. In this way, the command distribution unit 410 also determines the stripe count 515 of the context 435 associated with the data stripe operation has reached a threshold value. Furthermore, the command distribution unit 410 modifies (e.g., updates) the context state 505 of the context 435 associated with the data stripe operation to the idle state to indicate the stripe count 515 of the context 435 associated with the data stripe operation has reached the threshold value. In this way, the command distribution unit 410 releases the context 435 for use in another data stripe operation.

Because the storage controller 300 includes multiple page frames 425 and multiple contexts 435 associated with the page frames 425, the storage controller 300 may process more than one data stripe operation at the same time. In this way, the storage controller 300 is capable of performing multiple data stripe operations in parallel. As a result, throughput of the nonvolatile memory controller 105 is higher than throughput of other nonvolatile memory controllers capable of processing only a single data stripe operation at a time.

Figure 6:
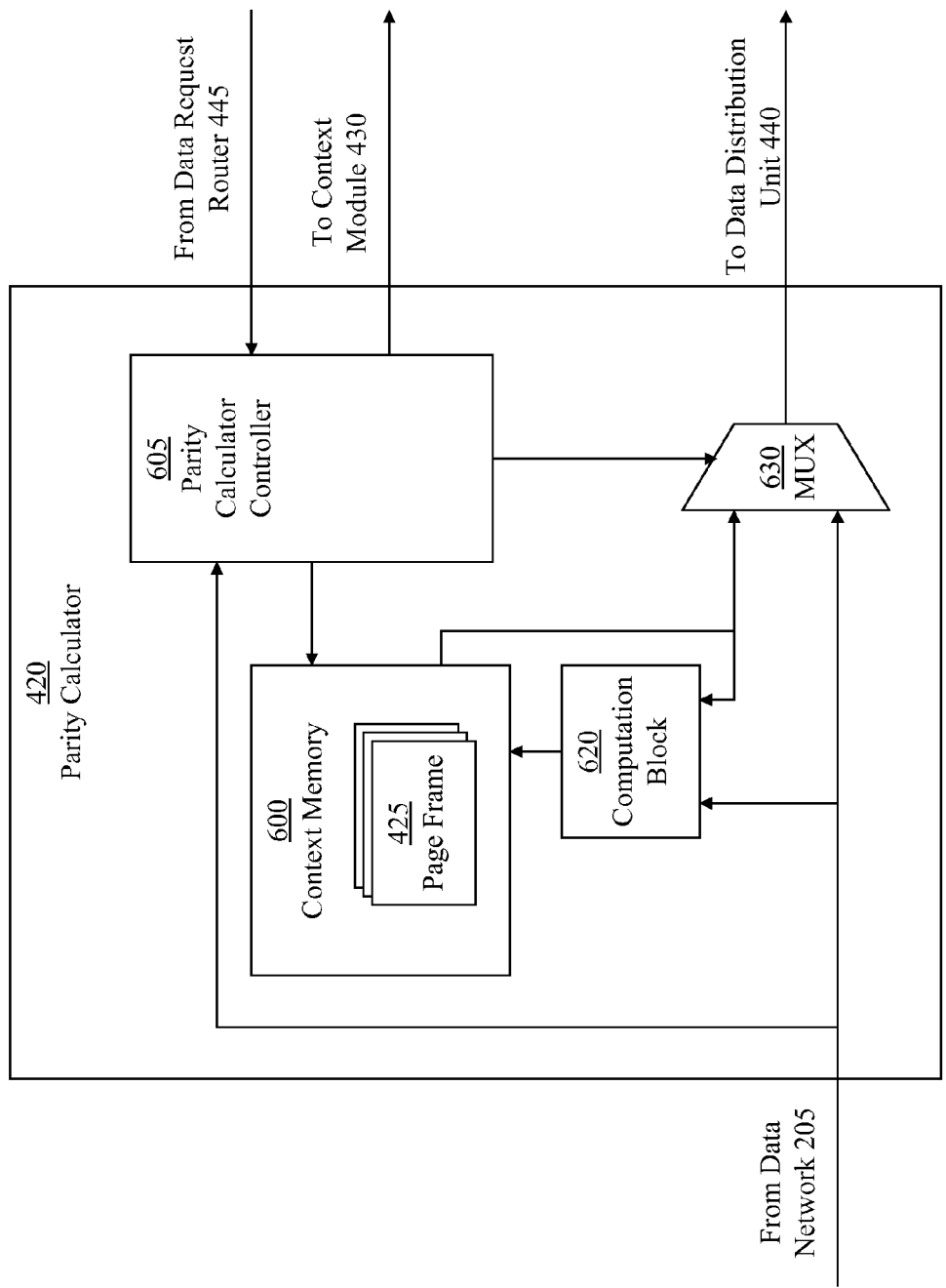
FIG. 6 is a block diagram of a parity calculator, in accordance with an embodiment of the present invention.

FIG. 6 illustrates the parity calculator 420, in accordance with an embodiment of the present invention. The parity calculator 420 includes a context memory 600, a parity calculator controller 605, a computation block 620, and a selector (MUX) 630. For example, the selector 630 may be a multiplexer. The context memory 600 is coupled (e.g., connected) to data network 205, the parity calculator controller 605, the computation block 620, and the selector 630. The computation block 620 is coupled (e.g., connected) to the data network 205 and the selector 630. The selector 630 is coupled (e.g., connected) to the data network 205, the parity calculator controller 605, and the data distribution unit 440. Additionally, the parity calculator controller 605 is coupled (e.g., connected) to the data network 205, the data request router 445, and the context module 430. As illustrated in FIG. 6, the context memory 600 includes the page frames 425 of the parity calculator 420.

In operation, the parity calculator 420 receives a completion packet from the data network 205. In response to receiving the completion packet, the parity calculator controller 605 generates a control signal and provides the control signal to the selector 630. In response to the control signal received from the parity calculator controller 605, the selector 630 passes the completion packet to the data distribution unit 440. In turn, the data distribution unit 440 distributes the completion packet to a command processing unit 415, as is described more fully herein. In this way, the parity calculator 420 forwards the completion packet to the command processing unit 415.

Additionally, the context module controller 520 determines whether the completion packet includes a data update command. If the completion packet includes a data update command, the parity calculator controller 605 identifies the context 435 of the data stripe operation associated with the data update command based on a flow identifier in the completion packet. In this process, the parity calculator controller 605 identifies the context 435 containing a flow identifier 510 that is the same as the flow identifier contained in the completion packet.

If the context state 505 of the context 435 is the allocated state, the parity calculator controller 605 generates a control signal and provides the control signal to the context memory 600. In response to the control signal received from the parity calculator controller 605, the context memory 600 stores the data block contained in the completion packet into the page frame 425 associated with the context 435. The data block stored in the page frame 425 is an initial parity block for the data stripe operation associated with the data block. Further, the parity calculator controller 605 modifies (e.g., updates) the context state 505 of the context 435 to the initialized state. In some embodiments, the parity calculator controller 605 also modifies (e.g., decrements) the stripe count 515 of the context 435, as is described more fully herein.

Otherwise, if the context state 505 of the context 435 is the initialized state, the controller generates a control signal and provides the control signal to context memory 600. In response to the control signal received from the parity calculator controller 605, the context memory 600 provides the data block stored in the page frame 425 associated with the context 435 to the computation block 620. In turn, the computation block 620 generates an updated data block (i.e., an updated parity block) by performing a parity operation (e.g., an exclusive-or operation) on the data block received from the context memory 600 and the data block in the completion packet.

The parity calculator controller 605 generates another control signal and provides the control signal to the context memory 600. In response to the control signal, the context memory 600 stores the updated data block into the page frame 425 associated with the context 435. In this way, the parity calculator 420 performs an update operation on the parity block (i.e., data block) stored in the page frame 425. Additionally, the parity calculator controller 605 modifies (e.g., decrements) the stripe count 515 of the context 435, as is described more fully herein. In this way, the parity calculator controller 605 counts a number of update operations performed on the initial data block stored in the page frame 425. Moreover, if the stripe count 515 has reached a threshold value (e.g., a value of zero), the parity calculator controller 605 updates the context state 505 of the context 435 to a completed state. In this way, the context module controller 520 indicates generation of the parity block is complete.

If the parity calculator controller 605 receives a data request packet including a write parity command from the data request router 445, the context module controller 520 identifies the context 435 containing the flow identifier contained in the data request packet. Additionally, the parity calculator controller 605 generates a control signal and provides the control signal to context memory 600. In response to the control signal received from the parity calculator controller 605, the context memory 600 provides the parity block stored in the page frame 425 associated with the context 435 to the selector 630. Additionally, the parity calculator controller 605 provides the request tag in the data request packet including the write parity command to the selector 630.

The parity calculator controller 605 generates another control signal and provides the control signal to the selector 630. In response to the control signal received from the parity calculator controller 605, the selector 630 passes the parity block and the request tag received from the parity calculator controller 605 to the data distribution unit 440. In this way, the parity calculator 420 provides a completion packet including the parity block and the request tag to the data distribution unit 440.

In some instances, the parity calculator controller 605 may receive a data completion packet including a data update command from the data network 205 and a data request packet include a write parity command from the data request router 445 at the same time. In these embodiments, the parity calculator controller 605 processes the packets sequentially. In other embodiments, the parity calculator controller 605 processes the packets substantially simultaneously. For example, the context memory 600 may be a dual-port memory and the parity calculator controller 605 may store an updated parity block into the context memory 600 for a data stripe operation and at the same time read a parity block from the context memory 600 for another data stripe operation.

Figure 7:
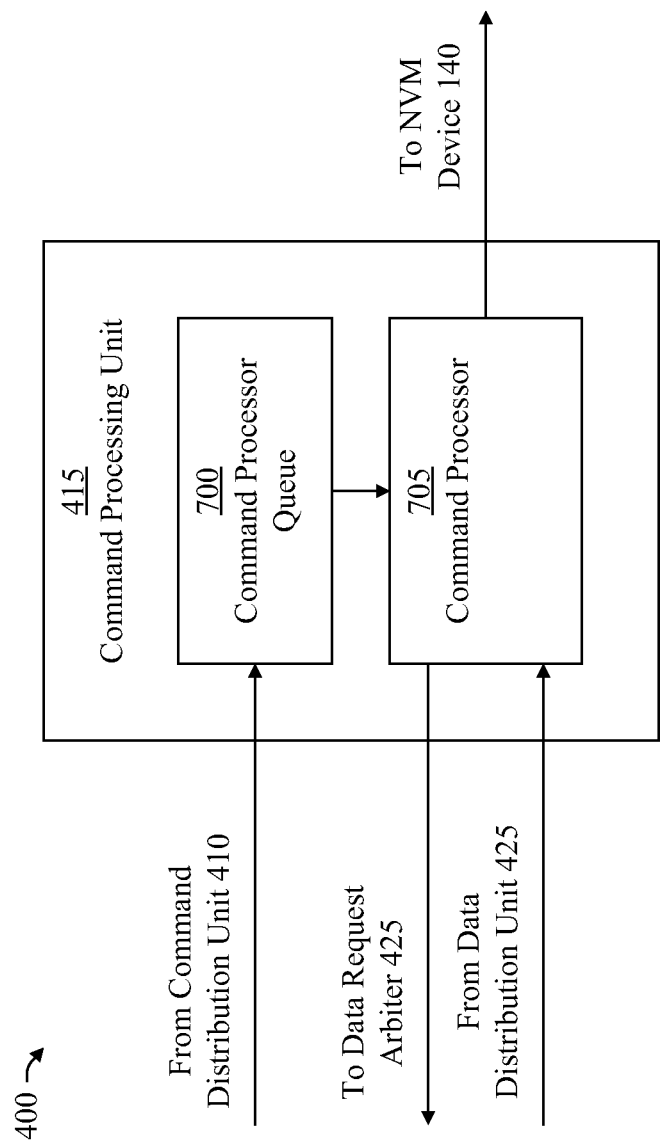
FIG. 7 is a block diagram of a processing unit, in accordance with an embodiment of the present invention.

FIG. 7 illustrates the processing unit, in accordance with an embodiment of the present invention. The command processing unit 415 includes a command processor queue 700 and a command processor 705 coupled (e.g., connected) to the command processor queue 700. The command processor queue 700 stores packets (e.g., request message packets) received from the command distribution unit 410. In various embodiments, the command distribution unit 410 writes a command to the command processing unit 415 by writing a request message packet including the command at a tail of the command processor queue 700. For example, the command processor queue 700 may be a first-in-first-out (FIFO) queue.

The command processor 705 reads a command at head of the command processor queue 700, for example by reading a request packet including the command at the head of the command processor queue 700. The command processor 705 processes the command by generating nonvolatile memory commands based on the command in the request packet. Further, the command processor 705 provides the nonvolatile memory commands to the nonvolatile memory device 140. In turn, the nonvolatile memory device 140 processes the commands.

In various embodiments, the nonvolatile memory commands generated by the command processor 705 are specific to a type of the nonvolatile memory device 140. For example, the nonvolatile memory commands may be specific to a particular manufacturer of the nonvolatile memory device 140. In some embodiments, the command processor 705 is programmable to generate nonvolatile memory commands for a variety of different types of nonvolatile memory devices 140.

Figure 8:
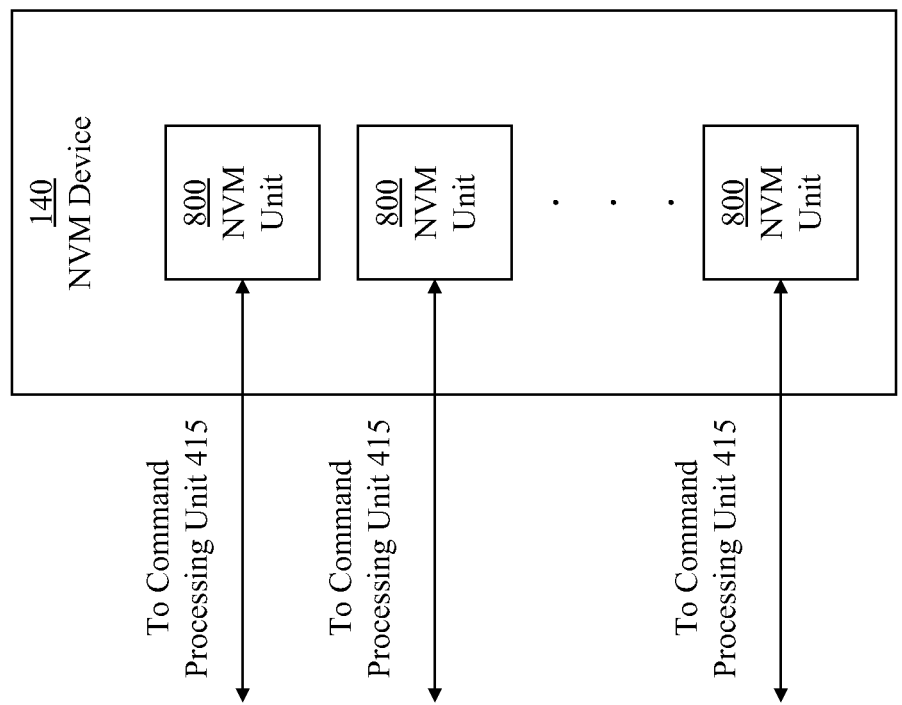
FIG. 8 is a block diagram of a nonvolatile memory device, in accordance with an embodiment of the present invention.

FIG. 8 illustrates the nonvolatile memory device 140, in accordance with an embodiment of the present invention. The nonvolatile memory device 140 includes nonvolatile memory units 800. Each of the nonvolatile memory units 800 is coupled (e.g., connected) to a corresponding command processing unit 415 in the command processing module 400. For example, each of the nonvolatile memory units 800 may be a nonvolatile memory device, such as a flash storage device.

In various embodiments, the storage controller 300 distributes the commands of a data stripe operation (i.e., data update commands and a parity write command) among the command processing units 415. In turn, each of the command processing units 415 writes a data block or a parity block into nonvolatile memory unit 800 corresponding to the command processing unit 415. In this way, the storage controller 300 performs the data stripe operation.

Figure 9:
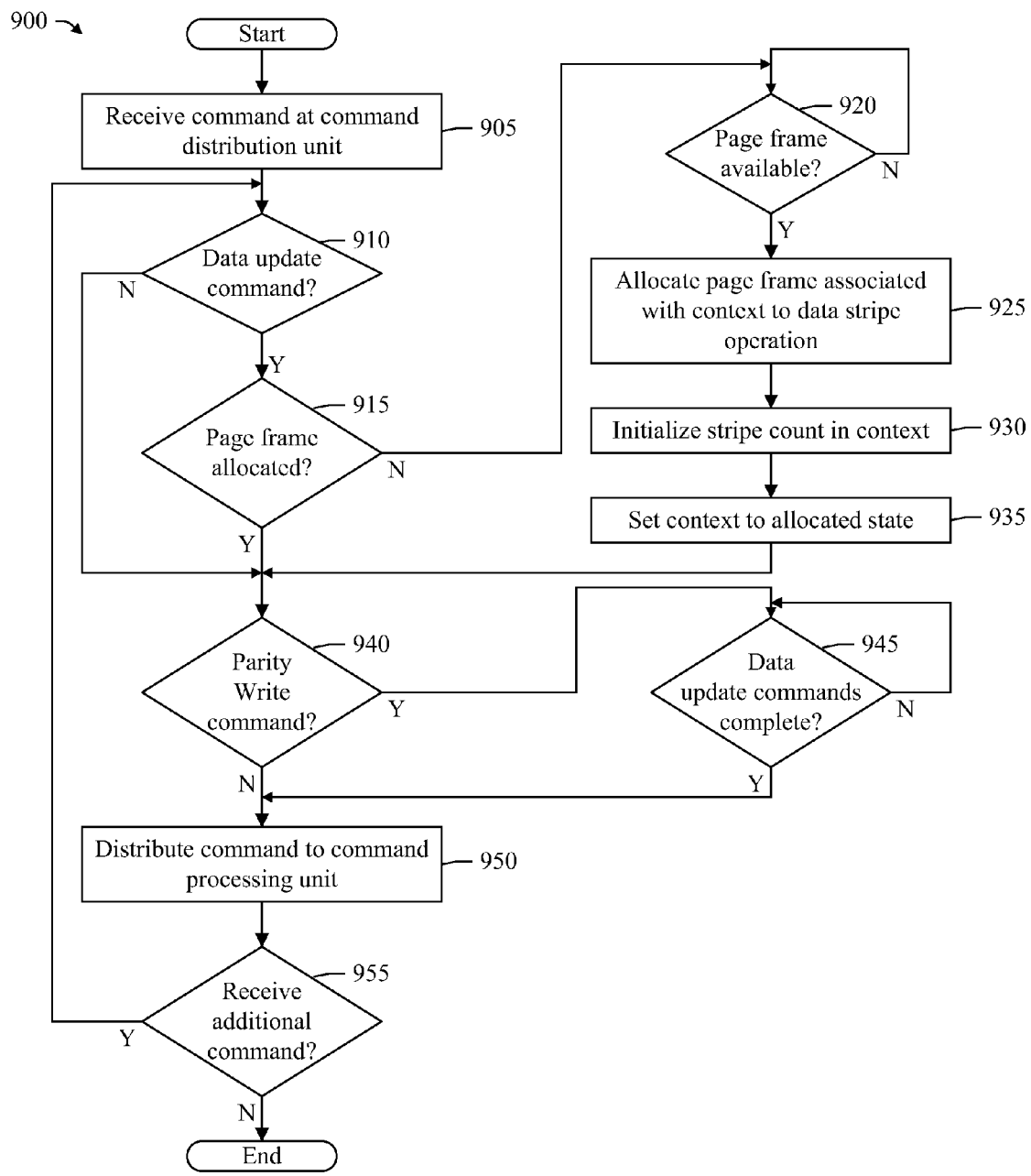
FIG. 9 is a flow chart of a portion of a method of generating a parity block, in accordance with an embodiment of the present invention.

FIG. 9 illustrates a portion of a method 900 of generating parity data, in accordance with an embodiment of the present invention. In various embodiments, the portion of the method 900 illustrated in FIG. 9 is performed by the command distribution unit 410 in the storage controller 300.

In step 905, a command is received at the command distribution unit. In various embodiments, the command distribution unit 410 receives the command of the data stripe operation by receiving a request message packet including the command. For example, the command distribution unit 410 may receive the request message packet from the command input queue 405. The portion of the method 900 then proceeds to step 910.

In step 910, it is determined whether the command is a data update command. In various embodiments, the command distribution unit 410 determines whether the command in the request message packet is a data update command. If the command in the request message packet is a data update command, the portion of the method proceeds to step 915. Otherwise, the portion of the method 900 proceeds to step 940.

In step 915, arrived at from the determination in step 910 that the command is a data update command, a determination is made as to whether a page frame is allocated to the data stripe operation associated with the data update command. In various embodiments, the command distribution unit 410 determines whether a page frame 425 is allocated to the data stripe operation associated with the command based on a flow identifier in the request message packet, as is described more fully herein. If a page frame 425 is allocated to the data stripe operation associated with the command, the portion of the method 900 proceeds to step 940. Otherwise, the portion of the method 900 proceeds to step 920.

In step 920, arrived at from the determination in step 915 that a page frame is not allocated to the data operation associated with the data update command, it is determined whether a page frame is available. In various embodiments, the command distribution unit 410 determines whether a page frame 425 is available by determining whether a context 435 is in the idle state. If the command distribution unit 410 identifies at least one context 435 in the idle state, the command distribution unit 410 determines a page frame 425 is available. If a page frame 425 is available, the portion of the method 900 proceeds to step 925. Otherwise, the portion of the method 900 returns to step 920.

In step 925, arrived at from the determining in step 920 that a page frame is available, a page frame associated with a context is allocated to the data stripe operation. In various embodiments, the command distribution unit 410 allocates a page frame 425 to the data stripe operation by selecting a context 435 in the idle state, setting the context state 505 of the context 435 to the allocated state, and modifying (i.e., setting) the flow identifier 510 in the context 435 to the flow identifier contained in the request message packet. The portion of the method 900 then proceeds to step 930.

In step 930, a stripe count is initialized in the context. In various embodiments, the command distribution unit 410 initializes the stripe count 515 in the context 435 associated with the data operation to an initial stripe count. For example, the initial stripe count may be equal to the number of data blocks associated with the data stripe operation. The portion of the method 900 then proceeds to step 935.

In step 935, the context is set to an allocated state. In various embodiments, the command distribution unit 410 sets the context 435 associated with the data operation to the allocated state. For example, the command distribution unit 410 may modify (i.e., set) the context state 505 of the context 435 to the allocated state. The portion of the portion of the method 900 then proceeds to step 940.

In step 940, arrived at from the determination in step 910 that the command is not a data update command, the determination in step 915 that a page frame is allocated to the stripe operation, or step 935 in which the context is set to the allocated state, it is determined whether the command is a parity write command. In various embodiments, the command distribution unit 410 determines whether the command is a parity write command. If the command is a parity write command, the method 900 proceeds to step 945. Otherwise, if the command is not a parity write command, the method 900 proceeds to step 950.

In step 945, arrived at from the determination in step 940 that the command is a parity write command, it is determined whether the data update commands of the data stripe operation are complete. In various embodiments, the command distribution unit 410 determines whether the data update commands of the data stripe operation are complete based on the stripe count 515 of the context 435 associated with the data stripe. If the stripe count 515 of the context 435 associated with the data stripe operation has reached a threshold value, the command distribution unit 410 determines the data update commands of the data stripe operation are complete and the method 900 proceeds to step 950. Otherwise, if the command distribution unit 410 determines the stripe count 515 of the context 435 associated with the data stripe has not reached a threshold value, the command distribution unit 410 determines the data update commands of the data stripe operation are not complete and the method 900 returns to step 945.

In step 950, arrived at from the determination in step 940 that the command is not a parity write command or from the determination in step 945 that the data update commands of the data stripe operation are complete, the command is distributed to a processing unit. In various embodiments, the command distribution unit 410 distributes the command to a command processing unit 415 by selecting the command processing unit 415 and providing the command to the command processing unit 415. The portion of the method 900 then proceeds to step 955.

In step 955, it is determined whether an additional command is received. In various embodiments, if the command distribution unit 410 receives an additional command of the data stripe operation, the portion of the portion of the method 900 returns to step 910. Otherwise, the portion of the method 900 ends.

In various embodiments, the portion of the method 900 illustrated in FIG. 9 may include more or fewer than the steps 905-955 illustrated in FIG. 9 and described above. In some embodiments, the steps 905-955 in the portion of the method 900 illustrated in FIG. 9 may be performed in a different order than the order illustrated in FIG. 9 and described above. In some embodiments, some of the steps 905-955 of the portion of the method 900 illustrated in FIG. 9 may be performed in parallel or substantially simultaneously. In various embodiments, one or more of the steps 905-955 may be performed more than once in the portion of the method 900 illustrated in FIG. 9.

Figure 10:
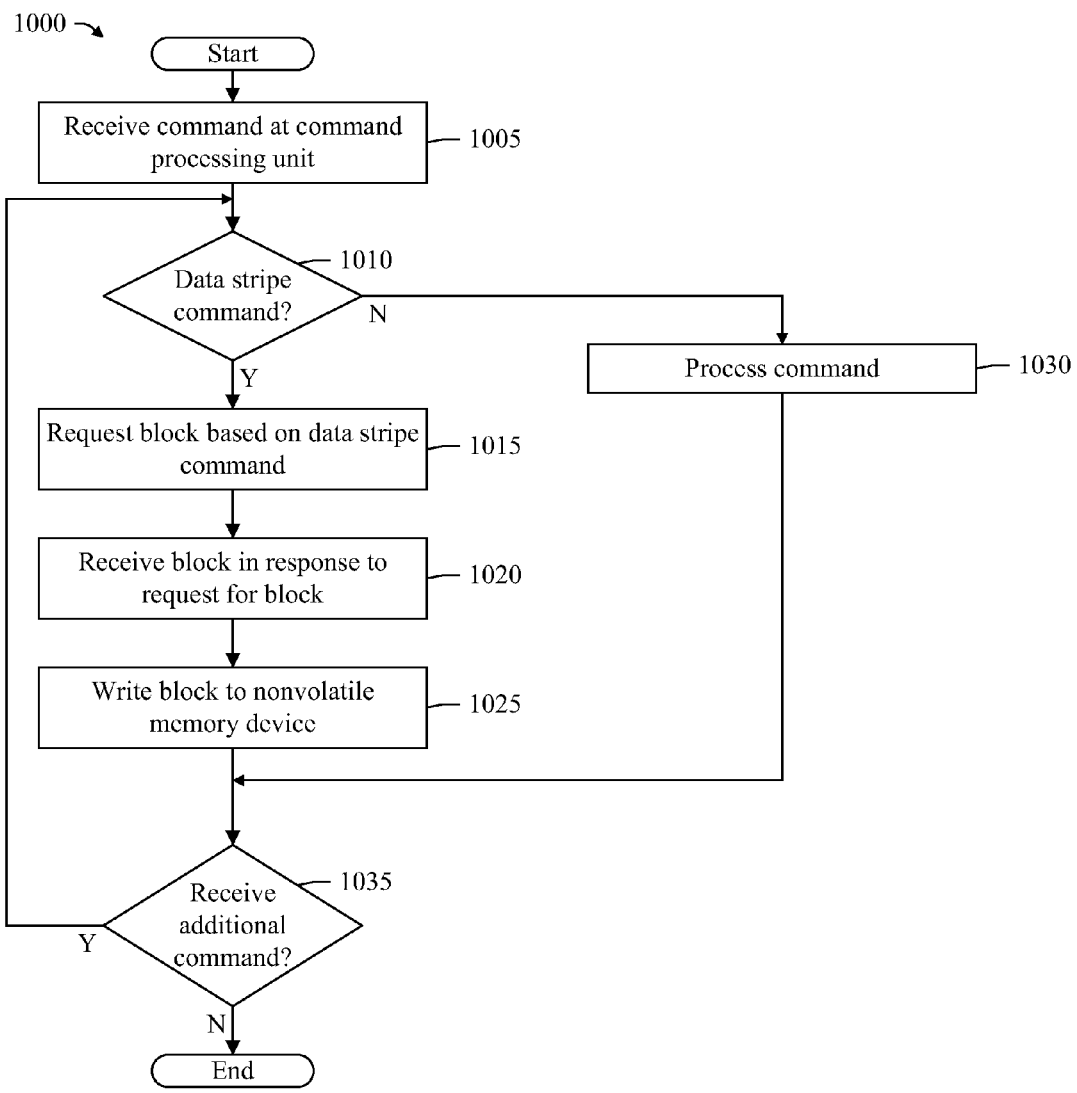
FIG. 10 is a flow chart of a portion of a method of generating a parity block, in accordance with an embodiment of the present invention.

FIG. 10 illustrates a portion of a method 1000 of generating parity data, in accordance with an embodiment of the present invention. In various embodiments, the portion of the method 1000 illustrated in FIG. 10 is performed by the command processing module 400 in the storage controller 300. In step 1005, a command is received by a command processing unit. In various embodiments, a command processing unit 415 in the command processing module 400 receives a command by receiving a request message packet including the command from the command distribution unit 410. The portion of the method 1000 then proceeds to step 1010.

In step 1010, it is determined whether the command is a data stripe command. In various embodiments, the command processing unit 415 determines whether the command is a data stripe command by determining whether the command is a data update command or a parity write command. If the command is a data stripe command, the portion of the method 1000 proceeds to step 1015. Otherwise, the portion of the method 1000 proceeds to step 1030.

In step 1015, arrived at from the determination in step 1010 that the command is a data stripe command, a request is generated for a block based the command. In various embodiments, the command processing unit 415 generates a request for the block by generating a data request packet including the command based on the request message packet. If the command is a data update command, the command processing unit 415 generates the data request for a data block based the data update command. Otherwise, if the command is a parity write command, the command processing unit 415 generates the data request for a parity block based the parity write command. Further, the command processing unit 415 provides the data request packet to the data request router 445 for routing to the controller memory 160 or the parity calculator 420, as is described more fully herein. The portion of the method 1000 then proceeds to step 1020.

In step 1020, a block is received in response to the request for the block. In various embodiments, the command processing unit 415 receives a completion packet including the block in response to the data request packet including the command. For example, the command processing unit 415 may receive a completion packet including a data block or a completion packet including a parity block. The portion of the method 1000 then proceeds to step 1025.

In step 1025, the block is written to a nonvolatile memory device. In various embodiments, the command processing unit 415 writes the block of the completion packet to the nonvolatile memory device 140 at the address of the storage location of the nonvolatile memory device 140 contained in the request message packet associated with the completion packet. For example, the completion packet may include a data block and the command processing unit 415 may write the data block to the nonvolatile memory device 140. As another example, the completion packet may include a parity block and the command processing unit 415 may write the parity block to the nonvolatile memory device 140. The portion of the method 1000 then proceeds to step 1035.

In step 1030, arrived at from the determination in step 1010 that the command is not a data stripe command, the command is processed. In various embodiments, the command processing unit 415 receiving the command processes the command. For example, the command may be a read request command for reading data from the nonvolatile memory device 140 or an erase request for erasing data from the nonvolatile memory device 140. The portion of the method 1000 then proceeds to step 1035.

In step 1035, arrived at from step 1025 in which a block is written to the nonvolatile memory or step 1030 in which a command is processed, it is determined whether an additional command of the data stripe operation is received by a command processing unit 415. In various embodiments, if a command processing unit 415 in the command processing module 400 receives an additional command of the data stripe operation, the portion of the method 1000 returns to step 1010. Otherwise, the portion of the method 1000 ends.

In various embodiments, the portion of the method 1000 illustrated in FIG. 10 may include more or fewer than the steps 1005-1035 illustrated in FIG. 10 and described above. In some embodiments, the steps 1005-1035 in the portion of the method 1000 illustrated in FIG. 10 may be performed in a different order than the order illustrated in FIG. 10 and described above. In some embodiments, some of the steps 1005-1035 of the portion of the method 1000 illustrated in FIG. 10 may be performed in parallel or substantially simultaneously. In various embodiments, one or more of the steps 1005-1035 may be performed more than once in the portion of the method 1000 illustrated in FIG. 10.

Figure 11:
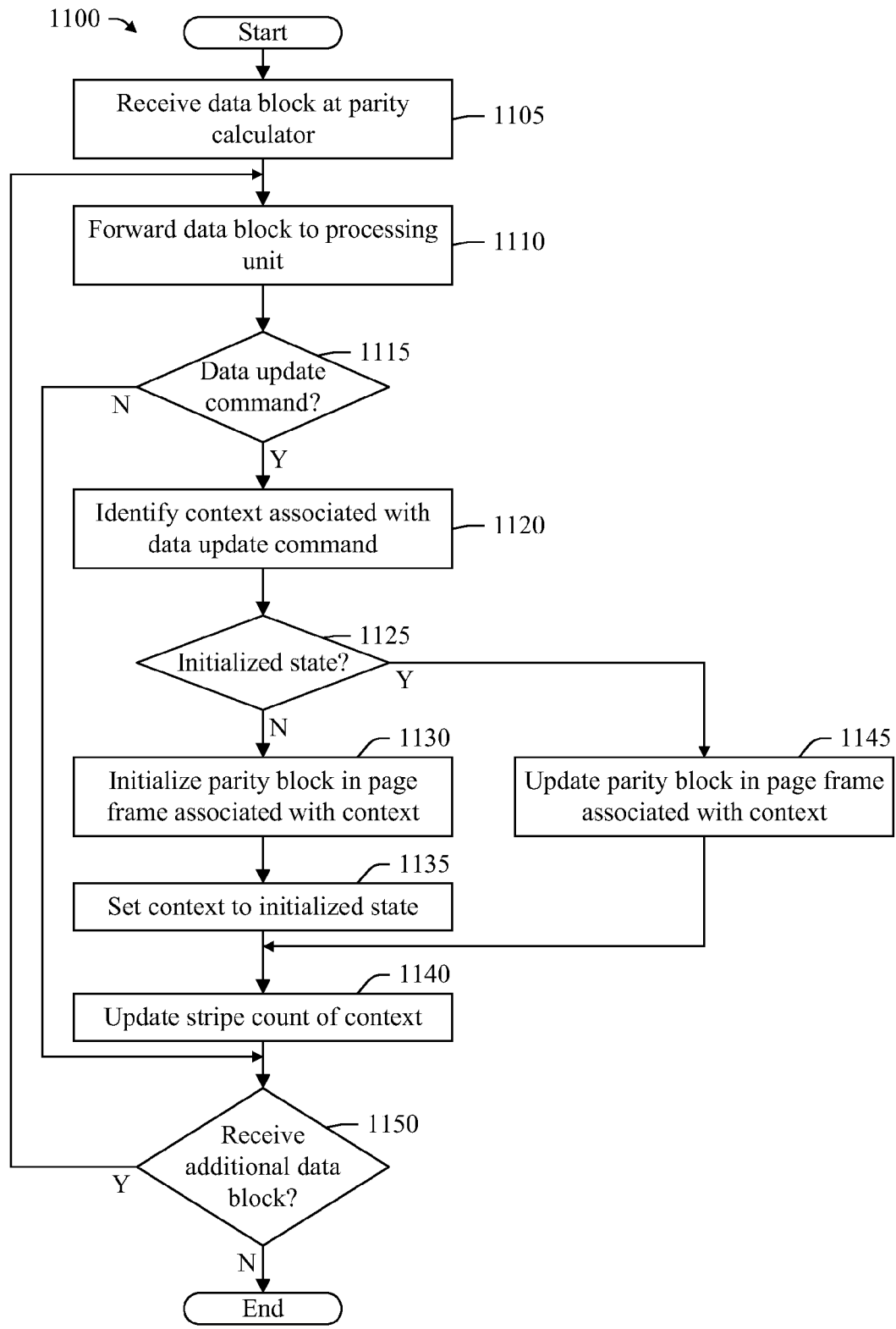
FIG. 11 is a flow chart of a portion of a method of generating a parity block, in accordance with an embodiment of the present invention.

FIG. 11 illustrates a portion of a method 1100 of generating parity data, in accordance with an embodiment of the present invention. In various embodiments, the portion of the method 1100 illustrated in FIG. 11 is performed by the parity calculator 420 in the storage controller 300.

In step 1105, a data block is received by the parity calculator. In various embodiments, the parity calculator 420 receives a data block by receiving a completion packet including the data block. For example, the parity calculator 420 may receive the completion packet from the data network 205. In addition to the data block, the completion packet includes a flow identifier contained in a data request packet associated with the completion packet and a request tag contained in the data request packet. The portion of the method 1100 then proceeds to step 1110.

In step 1110, the data block is forwarded to a processing unit. In various embodiments, the parity calculator 420 forwards the data block to a command processing unit 415 by forwarding a completion packet including the data block to the data distribution unit 440. In turn, the data distribution unit 440 distributes the completion packet including the data block to the command processing unit 415 based on the request tag contained in the completion packet. The portion of the method 1100 then proceeds to step 1115.

In step 1115, it is determined whether the command is a data update command. In various embodiments, the parity calculator 420 determines whether the command is a data update command. For example, the parity calculator controller 605 may determine based on command in the completion packet containing the data block whether the command is a data update command. If the command is a data update command, the portion of the method 1100 proceeds to step 1120. Otherwise, if the command is not a data update command, the portion of the method 1100 proceeds to step 1150.

In step 1120, arrived at from the determination in step 1115 that the command is a data update command, the context of the data update command is identified. In various embodiments, the parity calculator 420 identifies the context 435 of the data update command by matching the flow identifier contained in the completion packet with the flow identifier 510 in the context 435. The portion of the method 1100 then proceeds to step 1125.

In step 1125, it is determined whether the context state of the context is in an initialized state. In various embodiments, the parity calculator 420 determines whether the context 435 associated with the data block of the data operation is in the initialized state based on the context state 505 of the context 435. If the context 435 is in the initialized state, the portion of the method 1100 then proceeds to step 1145. Otherwise, if the context 435 is not in the initialized state, the portion of the method 1100 proceeds to step 1130.

In step 1130, arrived at from the determination in step 1125 that the context is not in the initialized state, a parity block is initialized in the page frame associated with the context. In various embodiments, the parity calculator 420 initializes a parity block in the page frame 425 associated with the context 435 of the data block by writing the data block into the page frame 425. The portion of the method 1100 then proceeds to step 1135. In step 1135, the context is set to an initialized state. In various embodiments, the parity calculator 420 sets the context 435 associated with the data stripe operation to the initialized state. For example, the parity calculator 420 may set context state 505 of the context 435 associated with the data stripe operation to the initialized state. The portion of the method 1100 then proceeds to step 1140.

In step 1140, the stripe count of the context is updated. In various embodiments, the parity calculator 420 updates the stripe count 515 of the context 435 associated with the data stripe operation, for example by decrementing the stripe count 515 of the context 435. The portion of the method 1100 then proceeds to step 1150.

In step 1145, arrived at from the determination in step 1125 that the context is in the initialized state, the parity block in the page frame is updated. In various embodiments, the parity calculator 420 generates an updated data block (i.e., an updated parity block) by performing an operation on the data block (i.e., parity block) in the page frame 425 and the data block in the data request packet received by the parity calculator 420. Further, the parity calculator 420 replaces the data block (i.e., parity block) in the page frame 425 with the updated data block (i.e., updated parity block). The portion of the method 1100 then proceeds to step 1140.

In step 1150, arrived at from the determination in step 1115 that the command is not a data update command or from step 1140 in which the stripe count of the context is updated, it is determined whether the parity calculator 420 receives an additional data block of the data stripe operation. In various embodiments, if the parity calculator 420 receives an additional data block of the data stripe operation, the portion of the method 1100 returns to step 1110. Otherwise, the portion of the method 1100 ends.

In various embodiments, the portion of the method 1100 illustrated in FIG. 11 may include more or fewer than the steps 1105-1150 illustrated in FIG. 11 and described above. In some embodiments, the steps 1105-1150 of the portion of the method 1100 illustrated in FIG. 11 may be performed in a different order than the order illustrated in FIG. 11 and described above. In some embodiments, some of the steps 1105-1150 of the portion of the method 1100 illustrated in FIG. 11 may be performed in parallel or substantially simultaneously. In various embodiments, one or more of the steps 1105-1150 may be performed more than once in the portion of the method 1100 illustrated in FIG. 11.

Figure 12:
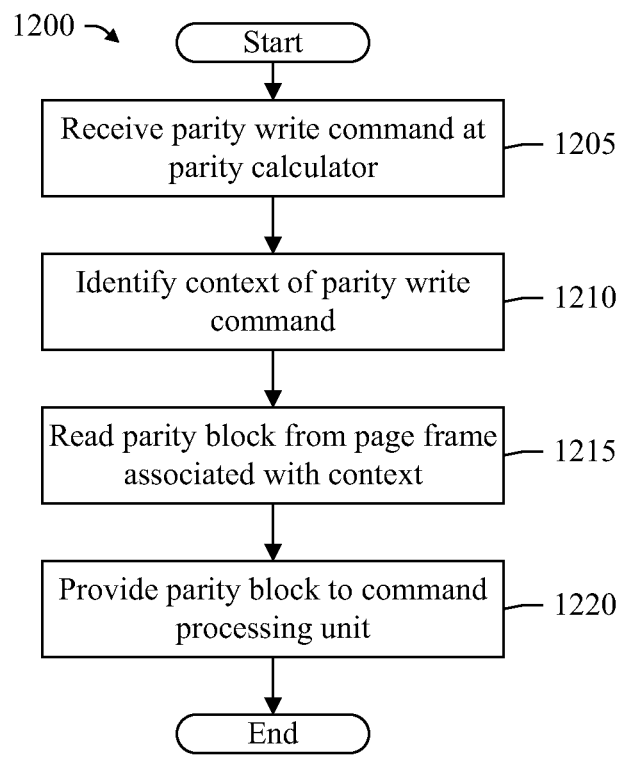
FIG. 12 is a flow chart of a portion of a method of generating a parity block, in accordance with an embodiment of the present invention.

FIG. 12 illustrates a portion of a method 1200 of generating parity data, in accordance with an embodiment of the present invention. In various embodiments, the portion of the method 1200 illustrated in FIG. 12 is performed by the parity calculator 420 in the storage controller 300. In step 1205, the parity calculator receives a parity write command. In various embodiments, the parity calculator 420 receives the parity write command from the data request router 445 by receiving a data packet including the parity write command. For example, the parity calculator controller 605 of the parity calculator 420 may receive the data packet including the parity write command from the data request router 445. The portion of the method 1200 then proceeds to step 1210.

In step 1210, the context of the parity write command is identified. In various embodiments, the parity calculator 420 identifies the context 435 of the parity write command based on a flow identifier in the data request packet including the parity write command. For example, the parity calculator controller 605 of the parity calculator 420 may identify a context 435 containing a flow identifier 510 which is the same as the flow identifier contained in the data request packet. The portion of the method 1200 then proceeds to step 1215.

In step 1215, a parity block is read from the page frame associated with the context. In various embodiments, the parity calculator 420 reads the parity block stored in the page frame 425 associated with the context 435 of the data stripe operation. For example, the parity calculator controller 605 of the parity calculator 420 may provide a control signal to the context memory 600 for reading the parity block from the page frame 425 associated with the context 435. The portion of the method 1200 then proceeds to step 1220.

In step 1220, the parity block is provided to a command processing unit. In various embodiments, the parity calculator 420 provides the command to a command processing unit 415 by providing the parity block read from the page frame 425 and the request tag in the data request packet including the parity write command to the data distribution unit 440. In this way, the parity block provides a completion packet including the parity block to the data distribution unit 440. In turn, the data distribution unit 440 distributes the completion packet including the parity block to the command processing unit 415 based on the request tag. For example, the data distribution unit 440 may distribute the completion packet to the command processing unit 415 that generated the data request message including the parity write operation. The portion of the method 1200 then ends.

In various embodiments, the portion of the method 1200 illustrated in FIG. 12 may include more or fewer than the steps 1200-1220 illustrated in FIG. 12 and described above. In some embodiments, the steps 1200-1220 of the portion of the method 1200 illustrated in FIG. 12 may be performed in a different order than the order illustrated in FIG. 12 and described above. In some embodiments, some of the steps 1200-1220 of the portion of the method 1200 illustrated in FIG. 12 may be performed in parallel or substantially simultaneously. In various embodiments, one or more of the steps 1200-1220 may be performed more than once in the portion of the method 1200 illustrated in FIG. 12.

In various embodiments, the nonvolatile memory controller 105 performs a data stripe operation by using a distributed processing technique in which the data distribution unit 440 performs the portion of the method 900, the command processing module 400 performs the portion of the method 1000, and the parity calculator 420 performs the portion of the method 1100 and the portion of the method 1200. In this way, the nonvolatile memory controller 105 is a distributed processing system for performing the data stripe operation. Furthermore, because the nonvolatile memory controller 105 includes contexts 435 for processing data stripe operations, the nonvolatile memory controller 105 may processes multiple data stripe operation in parallel.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A nonvolatile memory controller for performing a data stripe operation on a plurality of data blocks, the nonvolatile memory controller comprising:
a plurality of command processing units, each command processing unit of the plurality of command processing units configured to receive a command of a plurality of commands for performing the data stripe operation, the plurality of commands including a plurality of data update commands and a parity write command, each command processing unit of the plurality of command processing units receiving a data update command of the plurality of data update commands configured to request a data block of the plurality of data blocks based on the data update command, receive the data block in response to the request, and write the data block to a nonvolatile memory device; and
a parity calculator coupled to the plurality of command processing units, the parity calculator further comprising a context memory including a page frame, the parity calculator configured to receive the plurality of data blocks as a sequence of data blocks, to generate a parity block by storing a first data block of the sequence of data blocks into the page frame and updating the data block stored in the page frame with each data block following the first data block in the sequence of data blocks, without storing each data block in a data buffer, the command processing unit receiving the parity write command configured to write the parity block to a nonvolatile memory based on the parity write command.

2. The nonvolatile memory controller of claim 1, wherein the parity calculator is further configured to update the data block stored in the page frame by performing a logical operation on the data block stored in the page frame and a data block following the first data block in the sequence of data blocks.

3. The nonvolatile memory controller of claim 2, wherein the logical operation includes an exclusive-or operation.

4. The nonvolatile memory controller of claim 1, further comprising a context associated with the page frame and including a stripe count for counting each occurrence of updating the parity block, the nonvolatile memory controller further comprising a command distribution unit configured to determine the parity block is generated by determining the stripe count has reached a threshold value.

5. The nonvolatile memory controller of claim 1, wherein the nonvolatile memory controller further comprises a command distribution unit configured to distribute the plurality of data update commands to command processing units of the plurality of command processing units, determine generation of the parity block is complete, and distribute the parity write command to a command processing unit of the plurality of command processing units in response to determining the parity block is complete.

6. The nonvolatile memory controller of claim 1, further comprising:
a controller memory configured to store the plurality of data blocks; and
a data network coupled to the controller memory, the plurality of command processing units, and the parity calculator, wherein the plurality of command processing units is further configured to request the plurality of data blocks by generating a plurality of data request packets, the controller memory is further configured to generate a plurality of completion packets including the plurality of data blocks, and both the parity calculator and the plurality of command processing units are further configured to receive the plurality of data blocks through the data network.

7. The nonvolatile memory controller of claim 6, wherein the nonvolatile memory controller further comprises a command distribution unit configured to distribute the plurality of data update commands to command processing units of the plurality of command processing units, determine generation of the parity block is complete, and distribute the parity write command to a command processing unit of the plurality of command processing units in response to determining the parity block is complete.

8. The nonvolatile memory controller of claim 7, wherein each command processing unit of the plurality of command processing units comprises a command processing unit command queue for storing commands distributed to the command processing unit from the command distribution unit.

9. The nonvolatile memory controller of claim 7, further comprising a context memory including a plurality of page frames, wherein each command of the plurality of commands includes a flow identifier, and the command distribution unit is further configured to allocate a page frame of the context memory to the data stripe operation by associating the flow identifier with the page frame.

10. The nonvolatile memory controller of claim 1, wherein the plurality of command processing units is further configured to perform a plurality of data stripe operations in parallel.

11. A nonvolatile memory controller comprising:
a command distribution unit configured to receive a plurality of commands for performing a data stripe operation on a plurality of data blocks, the plurality of commands comprising a plurality of data update commands and a parity write command;
a plurality of command processing units coupled to the command distribution unit, the command distribution unit further configured to distribute the plurality of data update commands among command processing units of the plurality of command processing units, each command processing unit receiving a data update command configured to request a data block of the plurality of data blocks based on the data update command, receive the data block in response to the request, and write the data block to a nonvolatile memory device; and
a parity calculator coupled to the plurality of command processing units, the parity calculator including a context memory including a page frame, the parity calculator configured to receive the data blocks of the plurality of data blocks as a sequence of data blocks, to generate a parity block by storing a first data block of the sequence of data blocks into the page frame and updating the data block stored in the page frame by performing an exclusive-or operation on the data block stored in the page frame and a data block following the first data block in the sequence of data blocks, the command distribution unit further configured to determine generation of the parity block is complete and to distribute the parity write command to a command processing unit of the plurality of command processing units in response to determining the parity block is complete, the command processing unit receiving the parity write command configured to write the parity block into the nonvolatile memory device.

12. The nonvolatile memory controller of claim 11, wherein the plurality of command processing units is further configured to process the plurality of data update commands in an arbitrary order.

13. The nonvolatile memory controller of claim 12, wherein the context memory includes a plurality of page frames for storing a plurality of parity blocks of a plurality of data stripe operations, and wherein the plurality of command processing units is further configured to perform the plurality of data stripe operations in parallel.

14. A method of generating parity data, the method comprising:
distributing a plurality of commands for performing the data stripe operation among a plurality of command processing units in the nonvolatile memory controller, the plurality of commands including a plurality of data update commands and a parity write command;
generating a plurality of data requests by the plurality of command processing units based on the plurality of data update commands;
receiving a plurality of data blocks at the plurality of command processing units and at a parity calculator of the nonvolatile memory controller in response to the plurality of data requests;
writing the plurality of data blocks to a plurality of nonvolatile memory devices by the plurality of command processing units;
generating a parity block in a page frame of a context memory by the parity calculator based on the plurality of data blocks by initializing a parity block in the page frame by storing a first data block of the sequence of data blocks into the page frame and updating the data block stored in the page frame with each data block following the first data block in the sequence of data blocks, without storing each data block in a data buffer;
determining that generation of the parity block is complete; and
writing the parity block to a nonvolatile memory device by a command processing unit of the plurality of command processing units based on the parity write command after determining generation of the parity block is complete.

15. The method of claim 14, wherein updating the data block stored in the page frame with each data block following the first data block in the sequence of data blocks comprises performing an operation on the data block stored in the page frame and a data block following the first data block in the sequence of data blocks.

16. The method of claim 15, wherein the operation includes an exclusive-or operation.

17. The method of claim 14, further comprising:
initializing a stripe count to a predetermined value; and
decrementing the stripe count in response to each occurrence of updating the parity block, wherein determining generation of the parity block is complete comprises determining the stripe count has reached a threshold value.

18. The method of claim 14, wherein the context memory includes a plurality of page frames and each command of the plurality of commands includes a flow identifier, the method further comprising allocating a page frame in the context memory to the data stripe operation by associating the flow identifier with the page frame.

* * * * *